United States Patent [19]

Iwatani et al.

[11] Patent Number: 5,491,400
[45] Date of Patent: Feb. 13, 1996

[54] CONTROL DEVICE FOR A VEHICULAR AC GENERATOR

[75] Inventors: Shirou Iwatani; Tatsuki Kouwa, both of Himeji, Japan

[73] Assignee: Mitsubishi Denki Kabushiki Kaisha, Tokyo, Japan

[21] Appl. No.: 187,524

[22] Filed: Jan. 28, 1994

[30] Foreign Application Priority Data

Feb. 4, 1993 [JP] Japan .................... 5-017533

[51] Int. Cl.⁶ .................................................. H02J 7/14
[52] U.S. Cl. .................................................. 322/28; 322/99
[58] Field of Search .................................................. 322/28, 99

[56] References Cited

U.S. PATENT DOCUMENTS

| | | | |
|---|---|---|---|
| 4,258,307 | 3/1981 | Mori et al. | 322/28 |
| 4,316,134 | 2/1982 | Balan et al. | 322/99 |
| 4,386,310 | 5/1983 | Sievers | 322/28 |
| 4,682,044 | 7/1987 | Hotate et al. | 290/40 B |
| 5,144,220 | 9/1992 | Iwatani et al. | 322/28 |
| 5,184,060 | 2/1993 | Iwatani | 322/99 |
| 5,210,480 | 5/1993 | Iwatani et al. | 322/28 |

*Primary Examiner*—Steven L. Stephan
*Assistant Examiner*—Nicholas Ponomarenko
*Attorney, Agent, or Firm*—Sughrue, Mion, Zinn, Macpeak and Seas

[57] ABSTRACT

A voltage regulator 3 for controlling the output voltage of the AC generator 1 includes two voltage dividers having junction points J1 and J2 coupled to the zener diode 306 controlling the ON/OFF of the controlling transistor 309 and the power transistor 310. The voltage level at the junction point J1 is varied by means of the short-circuiting transistor 313 in response to the output of control transistor 401. Usually, the voltage at the junction point J1 is higher than the voltage at the junction point J2, and the output voltage of the AC generator 1 is controlled on the basis of the voltage at the junction point J1 to a normal and a reduced level in accordance with the output at the target voltage change-over terminal B. When quick charging is needed, however, the control transistor 402 is turned on to ground the junction point J1, such that the output voltage of the AC generator 1 is controlled to a higher level on the basis of the voltage at the junction point J2.

11 Claims, 7 Drawing Sheets

CONTROL DEVICE FOR A VEHICULAR AC GENERATOR

BACKGROUND OF THE INVENTION

This invention relates to a control device for a vehicular AC generator and a method of controlling the same, and more particularly to such a control device and method by which the battery can be charged quickly when necessary.

Figure 7:
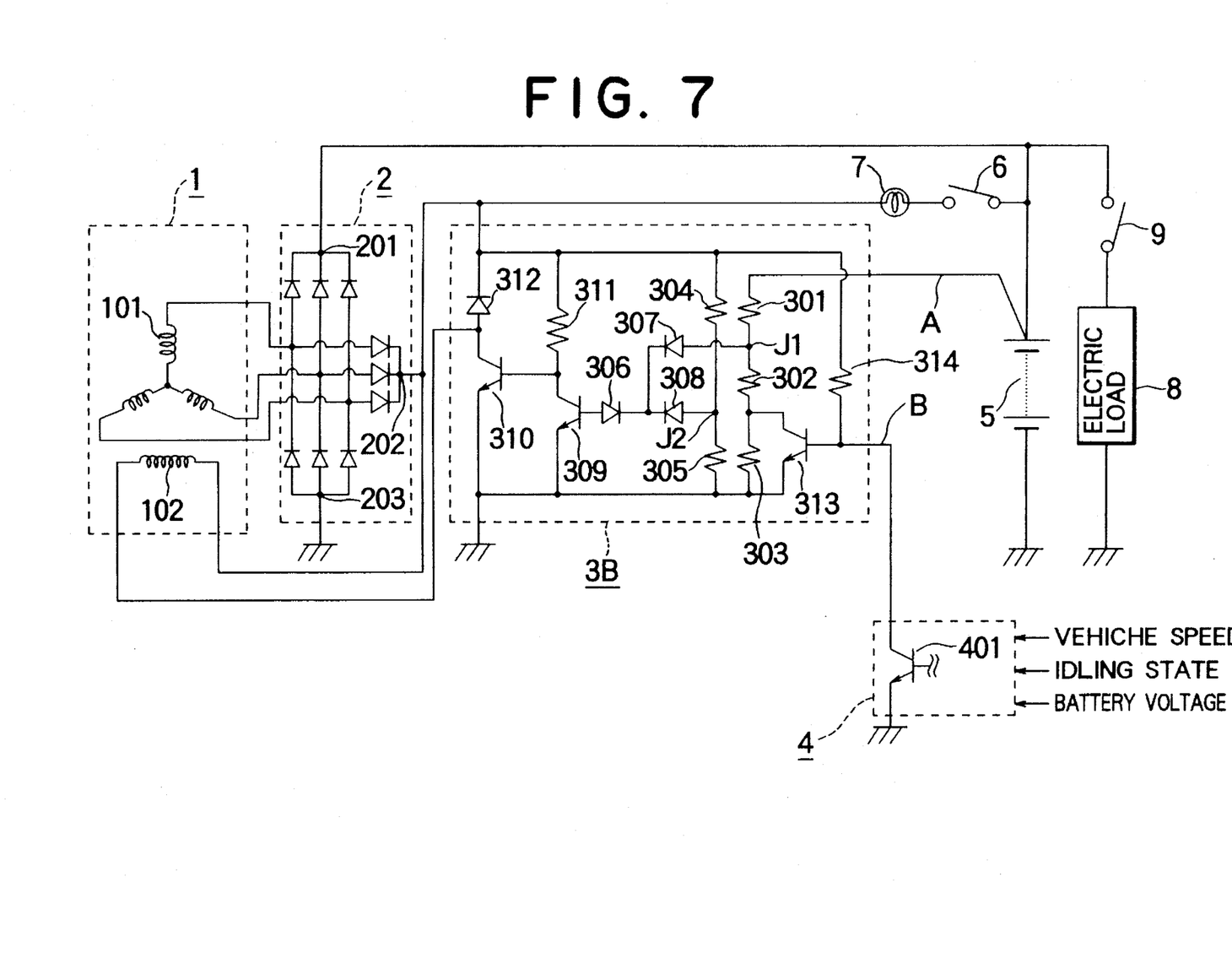
FIG. 7 is a circuit diagram showing a conventional control device for a vehicular AC generator.

FIG. 7 is a circuit diagram showing a conventional control device for a vehicular AC generator, which is disclosed, for example, in Japanese Utility Model Publication (Kokoku) No. 62-30480. The circuit of FIG. 7 includes an AC generator 1, a full-wave rectifier 2 for rectifying the output of the AC generator 1, and a voltage regulator 3 for regulating the output voltage of the AC generator 1 to several distinct predetermined levels in accordance with the operation condition. The target voltage to which the voltage regulator 3 regulates the output voltage the AC generator 1 is adjusted to two distinct target levels in accordance with the output of an engine control unit 4. Further, the target voltage is adjusted to a third level when the battery terminal voltage detector terminal A is disconnected from the battery 5.

The AC generator 1 includes a three-phase armature coil 101 mounted on the stator (not shown) of the AC generator 1, and a field coil 102 mounted on the rotor (not shown) of the AC generator 1. The full-wave rectifier 2 coupled to the output of the three-phase armature coil 101 consisting of six main and three auxiliary diodes includes a main rectifier output terminal 201, an auxiliary output terminal 202, and a grounded terminal 203.

The voltage regulator 3 coupled to the auxiliary output terminal 202 and the field coil 102 includes a first series of voltage divider resistors 301, 302, and 303 coupled across the battery terminal voltage detector terminal A and the ground, and a second series of voltage divider resistors 304 and 305 coupled across the auxiliary output terminal 202 and the ground. The voltage divider resistors 301, 302, and 303 constitute the first voltage detector circuit and the voltage divider resistors 304 and 305 constitute the second voltage detector circuit. The junction point J1 of the first voltage divider resistors 301, 302, and 303 and the junction point J2 of the second voltage divider resistors 304 and 305 are coupled, through a zener diode 306 and a diode 307 and a diode 308, respectively, to the base of a controlling transistor 309, which is coupled in series with a resistor 311 across the auxiliary output terminal 202 and the ground. The collector of the controlling transistor 309 is coupled to the base of a power transistor 310 coupled in series with a surge absorber diode 312 across the auxiliary output terminal 202 and the ground. Further, a short-circuiting transistor 313 is coupled across the two terminals of the voltage divider resistor 303. The target voltage change-over terminal B of the engine control unit 4 is coupled to the auxiliary output terminal 202 through a resistor 314 and to the base of the short-circuiting transistor 313.

The engine control unit 4 includes a control transistor 401, the base of which is coupled to a control signal representing, for example, the vehicle speed, idling state, and the battery voltage. A serial connection of a key switch 6 and a charging state display lamp 7 is coupled across the battery 5 and the auxiliary output terminal 202 of the full-wave rectifier 2. Further, an electric load 8 is coupled across the main rectifier output terminal 201 and the ground through a load switch 9. The battery 5 is coupled across the main rectifier output terminal 201 and the ground.

2

Normally (i.e., if the battery terminal voltage detector terminal A is not disconnected), the voltage regulator 3 regulates the output voltage of the AC generator 1 to two distinct target voltage levels in accordance with the output of the engine control unit 4. When the control transistor 401 of the engine control unit 4 is turned off and hence the voltage at the target voltage change-over terminal B is at the high level H, the short-circuiting transistor 313 is turned on to short-circuit the voltage divider resistor 303, the voltage is controlled to the normal target level (e.g., 14.4 V) determined by the resistance ratio of resistor 302 with respect to the sum of the resistors 301 and 302. When, on the other hand, the control transistor 401 of the engine control unit 4 is turned on and hence the voltage at the target voltage change-over terminal B is at the low level L, the voltage is controlled to the reduced target level (e.g., 12.8 V) determined by the resistance ratio of the resistors 301 through 303. More particularly, the reduced target level is determined by the resistance ratio of the serial connection of the resistors 302 and 303 with respect to the serial connection of the resistors 301, 302 and 303. Next, the operation of the circuit is described in greater detail.

When the key switch 6 is closed to start the engine, the base current is supplied from the battery 5 to the power transistor 310 through the key switch 6, the charging state display lamp 7, and the resistor 311. The power transistor 310 is thus turned on, such that the field current is supplied from the battery 5 to the field coil 102 through the key switch 6 and the charging state display lamp 7. Thus, the charging state display lamp 7 is turned on to indicate that the battery 5 is not currently charged. At the same time, the base current is supplied to the short-circuiting transistor 313 from the battery 5 through the resistor 314. The short-circuiting transistor 313 is thus turned on, to short-circuit the voltage divider resistor 303. Thus, the first voltage detector circuit is constituted only of the voltage divider resistors 301 and 302.

When the engine is started under this circumstance, an AC voltage corresponding to the rpm of the engine is induced across the three-phase armature coil 101, and the output of the AC generator 1 is full-wave rectified by the full-wave rectifier 2. Assume that the full-wave rectified output voltage of the AC generator 1 is still less than a predetermined level, 14.4 V, and that the control transistor 401 of the engine control unit 4 is turned off and hence the voltage at the target voltage change-over terminal B is at the high level H. Then the voltage at the junction point J1 is still insufficient to cause the break-down of the zener diode 306, and hence the zener diode 306 is kept turned off. The controlling transistor 309 is thus also kept turned off, and the power transistor 310 continues to be turned on to supply the field current to the field coil 102. As the rpm of the AC generator 1 increases with the increase of the rpm of the engine, the output voltage thereof rises. When the output voltage of the AC generator 1 thus exceeds the predetermined level, 14.4 V, the voltage at the junction point J1 rises above the level to cause the break-down of the zener diode 306. The zener diode 306 is thus turned on, thereby turning on the controlling transistor 309. The power transistor 310 is thus turned off. The supply of the current to the field coil 102 is thus interrupted, to reduce the output voltage of the AC generator 1. When the output voltage level of the AC generator 1 falls to or below the predetermined level, 14.4 V, the zener diode 306 and hence the controlling transistor 309 are again turned off, thereby turning on the power transistor 310. The supply of the field current to the field coil 102 is resumed, to raise the output voltage of the AC generator 1.

By repeating the above operations, the output of the AC generator 1 is controlled to the predetermined normal target level, 14.4 V. The battery 5 is charged by the output of the AC generator 1 and the electric load 8 is supplied with power. When the voltage across the battery 5 thus rises to a level substantially equal to the output voltage of the AC generator 1 supplied from the auxiliary output terminal 202, the charging state display lamp 7 is turned off to indicate that the charging of the battery 5 is now complete.

The base of the control transistor 401 of the engine control unit 4 receives a signal based on the information supplied from various sensors (e.g., the information upon the vehicle speed, the idling state, and the battery voltage). Thus, when the engine is under normal operating condition and not in the idling state, the base of the control transistor 401 is at the low level, and the control transistor 401 is turned off. The short-circuiting transistor 313 is thus turned on to short-circuit the voltage divider resistor 303. As a result, the output voltage of the AC generator 1 is controlled to the predetermined normal target level.

When, on the other hand, the engine control unit 4 determines, based on the information from various sensors, that the engine is in the idling state and the battery voltage is above a predetermined level, the control transistor 401 is turned on, to reduce the voltage at the target voltage change-over terminal B to the low level L. The short-circuiting transistor 313 is thus turned off, and the voltage at the junction point J1 now rises to a higher level determined by the resistors 301, 302 and 303. The regulation target voltage is thus adjusted to the reduced predetermined level, 12.8 V. When the engine is idling, the output voltage of the AC generator 1 is thus regulated to the reduced target level, to reduce the load upon the engine and to improve the mileage per gallon of the fuel of the vehicle.

Furthermore, when the battery terminal voltage detector terminal A is disconnected from the battery 5, the output voltage of the AC generator 1 is regulated to a quick-charging voltage, 15.6 V, determined by the voltage at the junction point J2 between the voltage divider resistors 304 and 305. The over-charging of the battery 5 is thereby prevented.

It is noted that the three target voltage levels are determined by the resistance ratios of the resistors 301 through 305.

As described above, the above conventional control device for a vehicular AC generator controls the output voltage of the AC generator 1 to the normal level, 14.4 V under the normal operation condition. When the engine is in the idling state, however, the target voltage is switched to the reduced level lower than the normal. The mileage of the vehicle is thereby improved. However, in the case of the above conventional control device, even when a rapid charging of the battery is needed, no measure can be taken other than raising the target output voltage of the AC generator 1 from the reduced to the normal level. The quick charging capacity of the control device is thus insufficient.

SUMMARY OF THE INVENTION

It is therefore an object of this invention to provide a control device for a vehicular AC generator and a method of controlling the same by which the battery can be charged quickly when necessary.

The above object is accomplished in accordance with the principle of this invention by a control device for controlling an output voltage of a vehicular AC generator which includes: first voltage detector circuit means, electrically coupled to an output of the AC generator, for outputting a first voltage level proportional to an output voltage of the AC generator; second voltage detector circuit means, electrically coupled to the output of the AC generator, for outputting a second voltage level proportional to the output voltage of the AC generator, the second voltage level being lower than the first voltage level output from the first voltage detector circuit means; voltage regulation means, coupled to the first and second voltage detector circuit means, for controlling a current supply to the coil of the AC generator thereby adjusting the output voltage of the AC generator to a target level, wherein the voltage regulation means regulates the current supply to the coil of the AC generator in response to a higher one of the first and second voltage levels output from the first and second voltage detector circuit means; target regulation voltage change-over means for selectively disabling the first voltage detector circuit means to reduce the first voltage level to a level substantially lower than the second level output from the second voltage detector circuit means such that the voltage regulation means controls the output voltage of the AC generator to a target level corresponding to the second voltage level output from the second voltage detector circuit means when the target regulation voltage change-over means disables the first voltage detector circuit means.

Preferably, the first and second voltage detector circuit means consist of a first and a second voltage divider circuit, respectively, the first and second voltage divider circuit being electrically coupled to the output of the AC generator, the first and second voltage level being provided at a first junction point of the first voltage divider circuit and a second junction point of the second voltage divider circuit, respectively. It is further preferred that the voltage regulation means includes: reference voltage detector means coupled to the junction points of the voltage dividers of the first and second voltage detector circuit means, the reference voltage detector means being turned on when the higher one of the first and second voltage level exceeds a predetermined reference level; and a switching element coupled serially with the coil of the AC generator, the switching element being turned on and off as the switching element is turned off and on, respectively.

Furthermore, the target regulation voltage change-over means may include: short-circuit means for short-circuiting the first junction point in response to a control signal representing a need for a quick charging of a battery electrically coupled to the AC generator. Alternatively, the target regulation voltage change-over means may include: disconnector means for electrically disconnecting the first voltage divider from the output of the AC generator in response to a control signal representing a need for a quick charging of a battery electrically coupled to the AC generator.

Preferably, the first voltage detector circuit means is coupled to a terminal of a battery electrically coupled to the AC generator and the second voltage detector circuit means is coupled to an output of the AC generator. It is also preferred that the target regulation voltage change-over means includes means for changing the first voltage level output by the first voltage detector circuit means to two distinct levels in response to a first control signal. Further, the target regulation voltage change-over means may disable the first voltage detector circuit means in response to a second control signal, the target regulation voltage change-over means further including a logical circuit means for determining a consistency of the first and second control signals, wherein the target regulation voltage change-over means changes the first voltage level and disables the first voltage detector circuit on the basis of an judgment of the logical circuit means.

The target regulation voltage change-over means may includes: means for generating at least two two-level signals; judgment means for determining a consistency of the two-level signals; and fail-safe circuit means for preventing the target regulation voltage change-over means from disabling the first voltage detector circuit means when the judgment means detects an inconsistency in the two-level signals.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
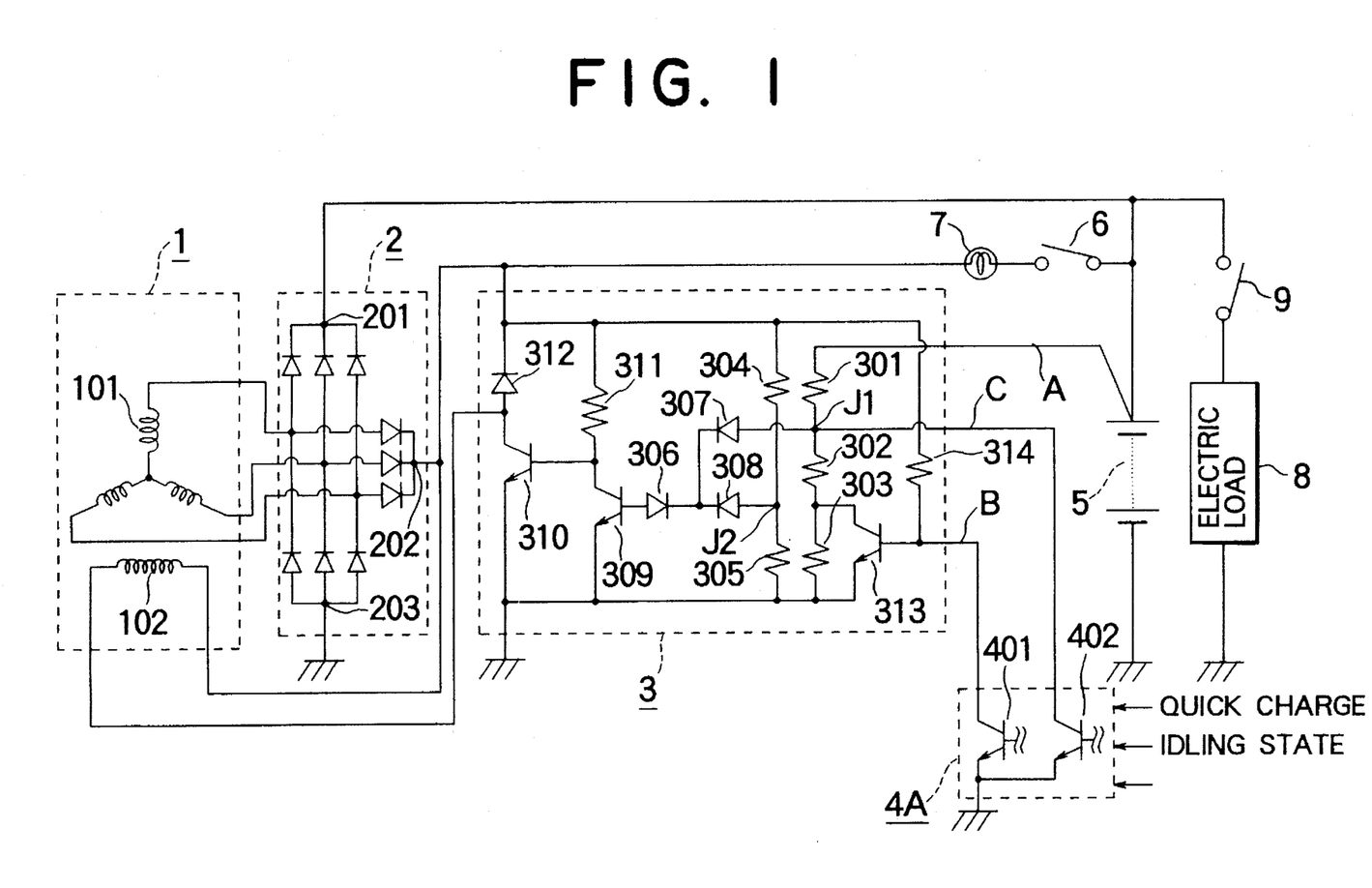
FIG. 1 is a circuit diagram showing a control device for a vehicular AC generator according to a first embodiment of this invention.

FIG. 1 is a circuit diagram showing a control device for a vehicular AC generator according to a first embodiment of this invention. In FIG. 1, the parts 1 through 3 and 5 through 9 are identical to those of FIG. 7. The engine control unit 4A, however, includes two transistors 401 and 402. The control transistor 401 is similar to the control transistor 401 of FIG. 7. Thus, the control transistor 401 is coupled across the target voltage change-over terminal B and the ground, the base thereof receiving the signal based on the information upon the idling state of the engine, etc. More specifically, the collector of the control transistor 401 is coupled to the target voltage change-over terminal B while the emitter thereof is grounded. On the other hand, the collector of the control transistor 402 is coupled to the junction point J1 through another target voltage change-over terminal C, the emitter thereof being grounded together with the emitter of the control transistor 401.

As in the case of the circuit of FIG. 7, provided that the control transistor 402 is kept turned off, the output voltage of the AC generator 1 is controlled to a normal and a reduced target voltage level, 14.4 V and 12.8 V, in response to to the signal level at the target voltage change-over terminal B. In addition, the output voltage of the AC generator 1 is controlled to a third target level, 15.6 V, when the battery terminal voltage detector terminal A is disconnected. The operation under such circumstances is identical to tile operation of the circuit of FIG. 7.

When, however, the control transistor 402 is turned on to reduce the voltage at the target voltage change-over terminal C to the low level L, the target regulation voltage is switched to the third or the quick-charging level, 15.6 V, even if the battery terminal voltage detector terminal A is not disconnected. Namely, assume, for example, that the discharge of the battery 5 is conspicuous during a time the vehicle is driven, and hence it is necessary to charge the battery 5 quickly, or that, for example, the engine is being decelerated and hence the AC generator 1 does not constitute an undue load upon the engine. Then, upon receiving an external signal from various sensors, the engine control unit 4A raises the signal level at the base of the control transistor 402 and turns it on. Consequently, the voltage level at the target voltage change-over terminal C falls to the low level L. Namely, the junction point J1 between the voltage divider resistors 301 and 302 is grounded through the target voltage change-over terminal C and the control transistor 402, and the first voltage detector circuit consisting of the voltage divider resistors 301, 302, and 303 is disabled. Thus, the output voltage of the AC generator 1 is controlled to the third or quick-charging level determined by the voltage divider resistors 304 and 305 constituting the second voltage detector circuit.

Namely, the ON/OFF of the controlling transistor 309 and the power transistor 310 is controlled by the ON/OFF of the zener diode 306. The zener diode 306 is turned on when the voltage at the cathodee (the terminal coupled to the diodes 307 and 308) rises above the break-down level thereof. Thus, the power transistor 310 is turned on to supply the field current to the field coil 102 when the voltage at the cathode of the zener diode 306 falls below the predetermined level (the break-down of the zener diode 306). The power transistor 310 is turned off to interrupt the field current to the field coil 102 when the voltage at the cathode of the zener diode 306 rises above the predetermined level. The cathodee of the zener diode 306 is coupled, through the diodes 307 and 308, respectively, to the junction point J1 and the junction point J2. Thus, the ON/OFF of the power transistor 310 is controlled in response to the higher one of the voltages at the junction point J1 and junction point J2. As described above, the voltage level at the junction point J1 is controlled to a first and a second level proportional to the voltage at the battery terminal voltage detector terminal A by turning on and off the short-circuiting transistor 313. Namely, when the short-circuiting transistor 313 is turned on to short-circuit the voltage divider resistor 303, proportion of the voltage at the junction point J1 with respect to the voltage at the battery terminal voltage detector terminal A is determined by the resistance ratio of the voltage divider resistors 301 and 302. When, on the other hand, the short-circuiting transistor 313 is turned off, the proportion of the voltage at the junction point J1 with respect to the voltage at the battery terminal voltage detector terminal A is determined by the resistance ratio of sum of the resistances of the voltage divider resistors 302 and 303 with respect to the resistance of the serial connection of the voltage divider resistors 301, 302, and 303.

When the voltage at the junction point J1 is reduced to the ground level, the ON/OFF of the zener diode 306 and hence the controlling transistor 309 and the power transistor 310 are determined exclusively by the voltage level at the junction point J2 between the voltage divider resistors 304 and 305. Proportion of the voltage at the junction point J2 with respect to the voltage at the auxiliary output terminal 202 is determined by the resistance ratio of the resistance of the voltage divider resistor 305 with respect to the sum of the resistances of the voltage divider resistors 304 and 305. The output voltage of the AC generator 1 is thus controlled to the third or the quick-charging level determined by the resistance ratio of the resistors 304 and 305. The battery 5 can thus be charged quickly when necessary.

Figure 2:
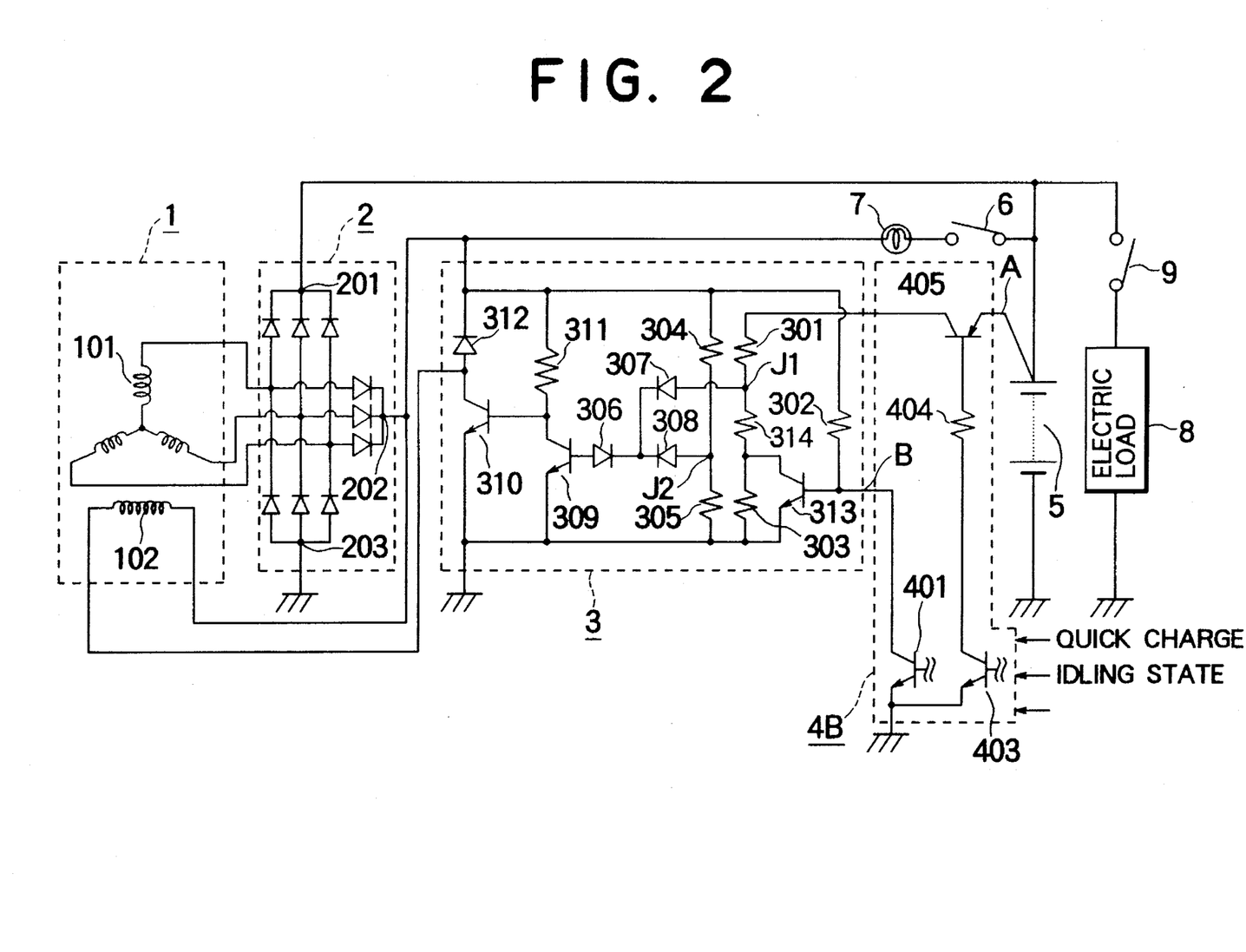
FIG. 2 is a circuit diagram showing a control device for a vehicular AC generator according to a second embodiment of this invention.

FIG. 2 is a circuit diagram showing a control device for a vehicular AC generator according to a second embodiment of this invention. The circuit of FIG. 2 is similar to that of FIG. 1, except for the engine control unit 4B. The engine control unit 4B includes, in addition to the control transistor 401 coupled across the target voltage change-over terminal B and the ground, a control transistor 403 coupled in series with a resistor 404, and an ON/OFF transistor 405 coupled in series with the first voltage detector circuit (the voltage divider resistors 301, 302, and 303) for connecting and disconnecting the voltage supply thereto from the battery 5. The collector of the control transistor 403 is coupled to the base of the ON/OFF transistor 405 through the resistor 404, while the emitter of the control transistor 403 is coupled to the ground together with the emitter of the control transistor 401. The emitter of the ON/OFF transistor 405 is coupled to the positive terminal of the battery 5 through the battery terminal voltage detector terminal A, while the collector thereof is coupled to a terminal of the first voltage detector circuit (i.e., to the terminal of the voltage divider resistor 301 opposite to that coupled to the junction point J1).

Usually, the control transistor 403 is kept turned on to ground the base of the ON/OFF transistor 405, and hence the ON/OFF transistor 405 is also kept turned on. Under such circumstances, the output voltage of the AC generator 1 is controlled to a normal and a reduced target voltage level, 14.4 V and 12.8 V, in response to the voltage level at the target voltage change-over terminal B. This operation is similar to that of the circuits of FIGS. 1 and 7. The output voltage of the AC generator 1 is controlled to a third level, 15.6 V, when the battery terminal voltage detector terminal A is disconnected.

Further, the quick charging operation of the circuit of FIG. 2 is similar to that of FIG. 1, except for some details as described below. Namely, assume that quick charging is necessary or the engine is decelerating under the condition where output voltage of the AC generator 1 is controlled to the normal or the reduced target level. Then, an external signal indicating the necessity of the quick charging or the deceleration of the engine is supplied from the various sensors to the engine control unit 4B. In response thereto, the engine control unit 4B turns off the control transistor 403 to raise voltage level at the base of the ON/OFF transistor 405. Thus, the ON/OFF transistor 405 is turned off, to disconnect the first voltage detector circuit (consisting of the resistors 301, 302, and 303) electrically from positive terminal of the battery 5. Thus, the voltage level at the junction point J1 is reduced to the ground level through the resistors 302 and 303, and the ON/OFF of the zener diode 306 and the controlling transistor 309 determined exclusively by the voltage level at the junction point J2 between the voltage divider resistors 304 and 305. The output voltage of the AC generator 1 is thus controlled to the third or the quick-charging level determined by the resistance ratio of the resistors 304 and 305. The battery 5 can thus be charged quickly when necessary.

Figure 3:
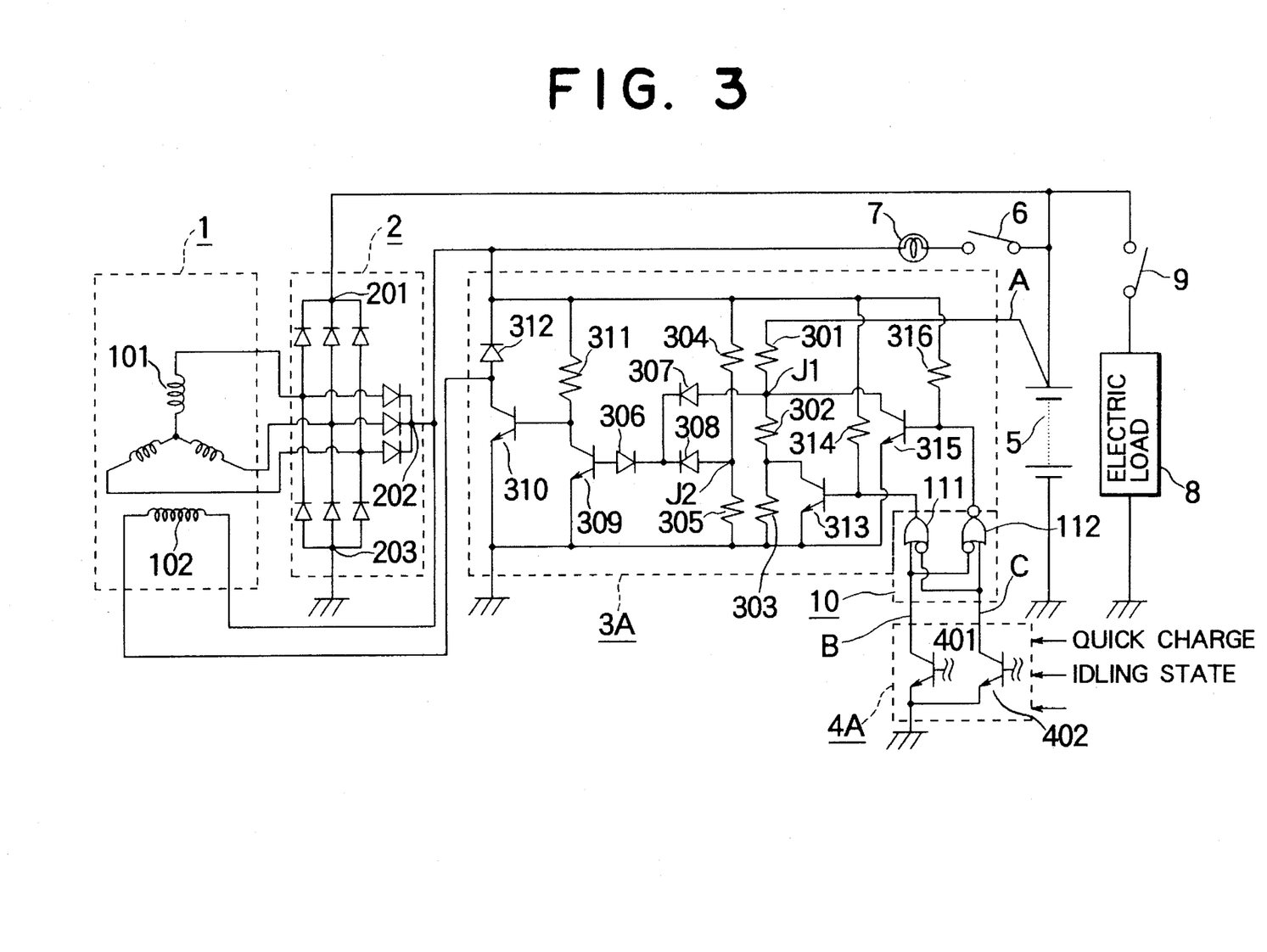
FIG. 3 is a circuit diagram showing a control device for a vehicular AC generator according to a third embodiment of this invention.

FIG. 3 is a circuit diagram showing a control device for a vehicular AC generator according to a third embodiment of this invention. The circuit of FIG. 3 is similar to that of FIG. 1 except for the following points. In addition to the parts 301 through 314 corresponding to those of FIG. 1, the voltage regulator 3A of FIG. 3 includes: a short-circuiting transistor 315 coupled in parallel with the serial connection of the voltage divider resistors 302 and 303; and a resistor 316 coupled across the auxiliary output terminal 202 and the base of the short-circuiting transistor 315. Further, a fail-safe regulation voltage change-over circuit 10 including an OR gate 111 and a NOR gate 112 is inserted between the engine control unit 4A and the voltage regulator 3A. The bubbles at the terminals of the OR gate 111 and the NOR gate 112 indicate the logical negation (i.e., the inversion). The non-inverting input terminal and the inverting input terminal of the OR gate 111 are coupled to the collector of the control transistor 401 and the control transistor 402, respectively. The output terminal of the OR gate 111 is coupled to the base of the short-circuiting transistor 313 of the voltage regulator 3A. The inverting input terminal and the non-inverting input terminal of the NOR gate 112 are coupled to the collector of the control transistor 401 and the control transistor 402, respectively. The output terminal of the NOR gate 112 is coupled to the base of the short-circuiting transistor 315 of the voltage regulator 3A. It is assumed that the gates 111 and 112 are operated in accordance with the positive logic. Namely, the high level H corresponds the logical 1 and the low level L corresponds to the logical 0. The output of the OR gate 111 corresponds to the OR of the signal level at the target voltage change-over terminal B and the negation of the signal level at the target voltage change-over terminal C. The output of the NOR gate 112, on the other hand, corresponds to the AND of the negation of the signal level at the target voltage change-over terminal B and the signal level at the target voltage change-over terminal C. The short-circuiting transistor 313 and the short-circuiting transistor 315 are turned on and off in response to the outputs of the OR gate 111 and the NOR gate 112, respectively.

The input to the base of the control transistor 401 represents the idling state of the engine, etc., and is rises to the high level H when the target level is to be reduced. On the other hand, the input to the base of the control transistor 402 represents the need for the quick charge of the battery 5. Thus, the two signals applied upon the base of the transistors 401 and 402 are complementary in character and should not rise to the high level H simultaneously. The signals levels B and C at the terminals B and C coupled to the collector of the transistors 401 and 402 are the inverse of the signals applied on the base thereof, respectively. The output of the OR gate 111 is the logical OR of the signal B and the negation of the signal C. Thus, the output of the OR gate 111 is reduced to the low level L to turn off the short-circuiting transistor 313 (thereby adjusting the target voltage to the reduced level) if and only if the signal B is at the low level L and the signal C is at the high level H. On the other hand, the output of the NOR gate 112 is rises to the high level H to turn on the short-circuiting transistor 315 (thereby disabling the first voltage detector circuit and raising the target voltage to the third or the quick charging level), if and only if the signal B is at the high level H and the signal C is at the low level L.

The relationship among the outputs B and C of the transistors 401 and 402, the outputs of the fail-safe regulation voltage change-over circuit 10, and the regulate voltage levels may be is shown in TABLE 1.

TABLE 1

| B | C | In. of B | In. of C | OR111 | NOR112 | Reg. V. | St. |
|---|---|---|---|---|---|---|---|
| L(ON) | L(ON) | H | H | H | L | 14.4 V | S1 |
| L(ON) | H(OFF) | H | L | L | L | 12.8 V | S2 |
| H(OFF) | L(ON) | L | H | H | H | 15.6 V | S3 |
| H(OFF) | H(OFF) | L | L | H | L | 14.4 V | S4 |

In the above TABLE 1, the states S1 through S4 are as follows. In state S1, both the transistors 401 and 402 are turned on to ground the terminals B and C. The engine control unit 4A is in failure. In state S2, the target voltage is adjusted to the reduced level and the load on the torque of the engine is minimized to reduce the fuel consumption. In state S3, the quick charging of the battery is performed. State S4 corresponds to the normal operation state of the engine, or the state where the terminals B and C are disconnected.

Further, in the above TABLE 1, the leftmost columns B and C indicate the signal levels at the terminals B and C coupled to the collector of the transistors 401 and 402, respectively. The next two columns are the inversions of the signal levels at the terminals B and C, and the columns OR 111 and NOR 112 indicate the output signal levels of the OR gate 111 and the NOR gate 112, respectively.

Normally, the control transistor 401 and the control transistor 402 of the engine control unit 4A are turned off (state S4 in TABLE 1). The output of the OR gate 111 is thus at the high level H, and hence the short-circuiting transistor 313 is turned on. On the other hand, the output of the NOR gate 112 is at the low level L, and hence the short-circuiting transistor 315 is turned off. Thus, among the voltage divider resistors 301, 302, and 303, only the voltage divider resistor 303 is short-circuited. The output voltage of the AC generator 1 is thus controlled to the normal target level 14.4 V determined by the resistance ratio of the resistors 301 and 302.

When, on the other hand, the discharge of the battery 5 is conspicuous and the battery 5 must be charged quickly, or when the engine is decelerating, the control transistor 402 is turned on in response to the external signal (state S3 in TABLE 1). The output of the NOR gate 112 of the fail-safe regulation voltage change-over circuit 10 thus rises to the high level H to turn on the short-circuiting transistor 315. The junction point J1 is thus grounded through the short-circuiting transistor 315. Hence the ON/OFF of the zener diode 306 and the controlling transistor 309 is determined exclusively by the voltage level at the junction point J2 between the voltage divider resistors 304 and 305. The output voltage of the AC generator 1 is thus controlled to the third or the quick-charging level 15.6 V determined by the resistance ratio of the resistors 304 and 305. The battery 5 can thus be charged quickly.

Further, when, for example, the engine is in the idling state and the load on the torque of the engine due to the AC generator 1 is to be reduced to improve the mileage per gallon of the fuel of the vehicle, the control transistor 401 is turned on and the control transistor 402 is turned off, in response to external signals applied upon the bases thereof (state S2 in TABLE 1). The outputs of the OR gate 111 and the NOR gate 112 of the fail-safe regulation voltage change-over circuit 10 are both reduced to the low level L. The short-circuiting transistors 313 and 315 are thus both turned off. The output voltage of the AC generator 1 is controlled to the reduced target level, 12.8 V, determined by the voltage level at the junction point J1. Proportion the voltage level at the junction point J1 with respect to the voltage at the battery terminal voltage detector terminal A is determined by the resistance ratio of: the serial connection of the resistors 302 and 303; and the serial connection of the resistors 301 through 303.

When both the target voltage change-over terminal B and C are disconnected (state S4) or when the engine control unit 4A is in failure to turn on both the control transistors 401 and 402 and the terminals B and C are both grounded (state S1), the output of the OR gate 111 is at the high level H while the output of the NOR gate 112 is at the low level L. Thus, the short-circuiting transistor 313 is turned on while the short-circuiting transistor 315 is turned off. As a result, the output voltage of the AC generator 1 is controlled to the normal target level 14.4 V. The fail-safe regulation voltage change-over circuit 10 thus provides the fail-safe capacity.

Figure 4:
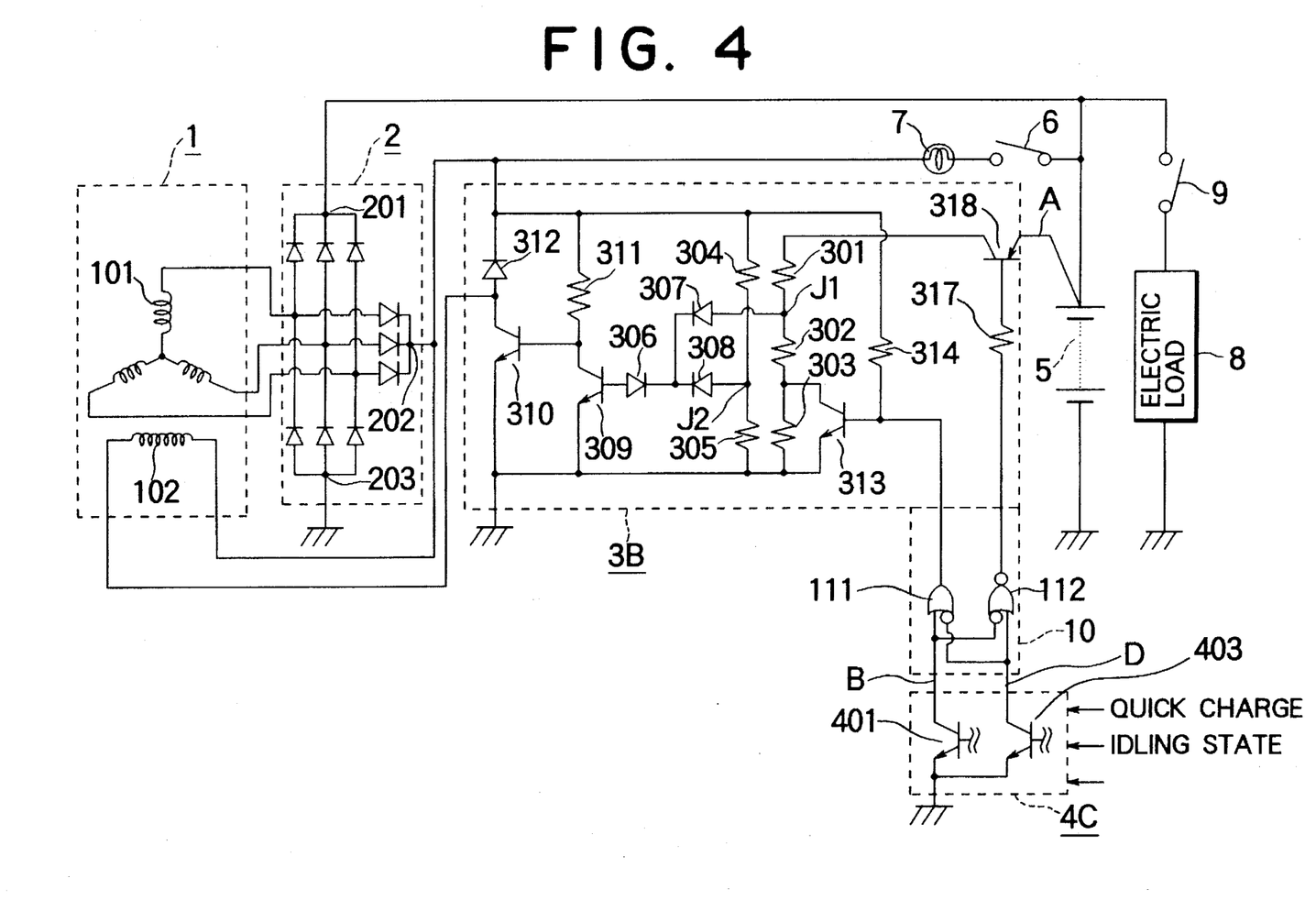
FIG. 4 is a circuit diagram showing a control device for a vehicular AC generator according to a fourth embodiment of this invention.

FIG. 4 is a circuit diagram showing a control device for a vehicular AC generator according to a fourth embodiment of this invention. The circuit of FIG. 4 is similar partly to that of FIG. 2 and partly to that of FIG. 3. Namely, a fail-safe regulation voltage change-over circuit 10 similar to that of FIG. 3 is inserted in the middle portion of the engine control unit 4B of FIG. 2. The voltage regulator 3B includes: a resistor 317 corresponding to the resistor 404 of FIG. 2; and an ON/OFF transistor 318 corresponding to the ON/OFF transistor 405 of FIG. 2. On the other hand, the engine control unit 4C does not include the resistor 404 and the ON/OFF transistor 405 of FIG. 2. The parts 1, 2, 5 through 10 are similar to those of FIG. 2.

As in the case of the circuit of FIG. 3, the logic of gates 111 and 112 are in accordance with the positive logic. Namely, the high level H corresponds the logical 1 and the low level L corresponds to the logical 0. The output of the OR gate 111 corresponds to the OR of the signal level at the target voltage change-over terminal B and the negation of the signal level at the target voltage change-over terminal D. The output of the NOR gate 112, on the other hand, corresponds to the AND of the negation of the signal level at the target voltage change-over terminal B and the signal level at the target voltage change-over terminal D. The short-circuiting transistor 313 and the ON/OFF transistor 318 are turned on and off in response to the outputs of the OR gate 111 and the NOR gate 112, respectively. Thus, the relationship among the outputs B and D of the transistors 401 and 403, the outputs of the fail-safe regulation voltage change-over circuit 10, and the regulate voltage levels may be summarized as shown in TABLE 2.

TABLE 2

| B | D | In. of B | In. of D | OR111 | NOR112 | Reg. V. | St. |
|---|---|---|---|---|---|---|---|
| L(ON) | L(ON) | H | H | H | L | 14.4 V | S1 |
| L(ON) | H(OFF) | H | L | L | L | 12.8 V | S2 |
| H(OFF) | L(ON) | L | H | H | H | 15.6 V | S3 |
| H(OFF) | H(OFF) | L | L | H | L | 14.4 V | S4 |

In the above TABLE 2, the states S1 through S4 are similar to those in TABLE 1. In state S1, both the transistors 401 and 403 are turned on to ground the terminals B and D. The engine control unit 4C is in failure. In state S2, the target level is reduced and the load on the torque of the engine is minimized to reduce the fuel consumption. In state S3, the quick charging of the battery is effected. State S4 corresponds to the normal operation state of the engine, or the state where the terminals B and D are disconnected.

Further, in the above TABLE 2, the leftmost columns B and D indicate the signal levels at the terminals B and D coupled to the collectors of the transistors 401 and 403, respectively. The next two columns are the inversions of the signal levels at the terminals B and D, and the columns OR 111 and NOR 112 indicate the output signal levels of the OR gate 111 and the NOR gate 112, respectively.

Normally, the control transistor 401 and the control transistor 403 of the engine control unit 4C are turned off (state S4 in TABLE 2). The output of the OR gate 111 is thus at the high level H, and hence the short-circuiting transistor 313 is turned on. Thus, the voltage divider resistor 303 is short-circuited. On the other hand, the output of the NOR gate 112 is at the low level L, and hence the ON/OFF transistor 318 is turned on. The output voltage of the AC generator 1 is thus controlled to the normal target level 14.4 V determined by the resistance ratio of the resistors 301 and 302.

When, on the other hand, the discharge of the battery 5 is conspicuous and the battery 5 must be charged quickly, or when the engine is decelerating, the control transistor 403 is turned on in response to the external signal applied upon the base thereof (state S3 in TABLE 2). The output of the NOR gate 112 of the fail-safe regulation voltage change-over circuit 10 thus rises to the high level H to turn off the ON/OFF transistor 318. The terminal of the battery 5 is thus electrically disconnected from the first voltage detector circuit consisting of the voltage divider resistors 301, 302, and 303. Hence the ON/OFF of the zener diode 306 and the controlling transistor 309 is determined exclusively by the voltage level at the junction point J2 between the voltage divider resistors 304 and 305. The output voltage of the AC generator 1 is thus controlled to the quick-charging level 15.6 V determined by the resistance ratio of the resistors 304 and 305. The battery 5 can thus be charged quickly.

Further, when, for example, the engine is in the idling state and the load on the torque of the engine due to the AC generator 1 is to be reduced to improve the mileage per gallon of the fuel of the vehicle, the transistors 401 is turned on and the control transistor 403 is turned, respectively, in response to external signals (state S2 in TABLE 2). The outputs of the OR gate 111 and the NOR gate 112 of the fail-safe regulation voltage change-over circuit 10 are both reduced to the low level L. The short-circuiting transistor 313 is thus turned off and the ON/OFF transistor 318 is turned on. The output voltage of the AC generator 1 is thus controlled to the reduced target level, 12.8 V, determined by the voltage level at the junction point J1. Under this circumstance, the proportion of the voltage level at the junction point J1 with respect to the voltage at the battery terminal voltage detector terminal A is determined by the resistance ratio of the serial connection of the resistors 302 and 303 with respect to the serial connection of the resistors 301 through 303.

When both the target voltage change-over terminal B and D are disconnected (state S4) or when the engine control unit 4C is in failure to turn on the control transistors 401 and 403, and the terminals B and D are both grounded (state S1), the output of the OR gate 111 is at the high level H while the output of the NOR gate 112 is at the low level L. Thus, the short-circuiting transistor 313 and the ON/OFF transistor 318 are both turned on. As a result, the output voltage of the AC generator 1 is controlled to the normal target level 14, 4 V. Thus, the fail-safe regulation voltage change-over circuit 10 provides the fail-safe capacity.

Figure 5:
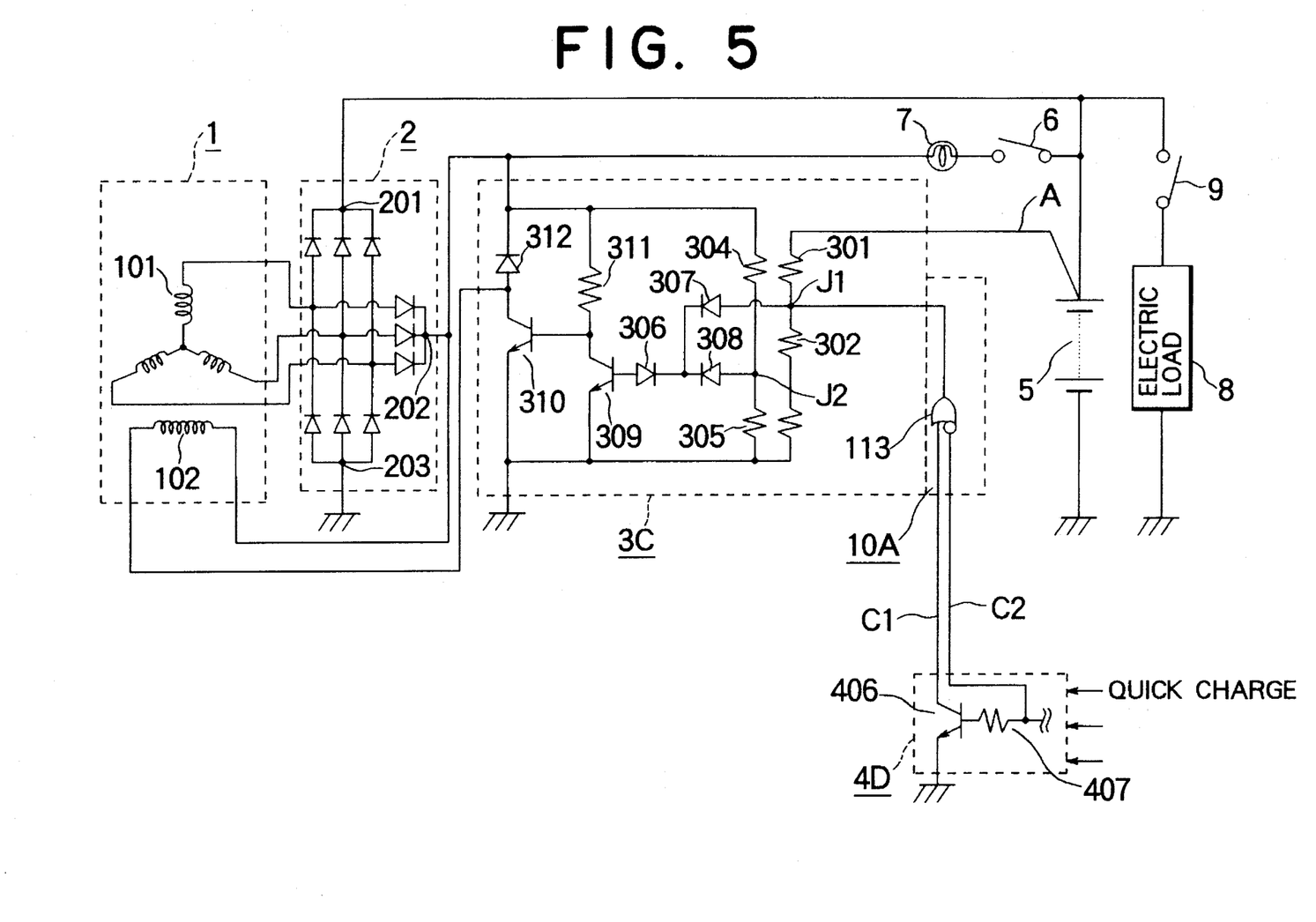
FIG. 5 is a circuit diagram showing a control device for a vehicular AC generator according to a fifth embodiment of this invention.

FIG. 5 is a circuit diagram showing a control device for a vehicular AC generator according to a fifth embodiment of this invention. The parts 1, 2, and 5 through 9 are identical to those of FIG. 1. The voltage regulator 3C is distinguished from the voltage regulator 3 of FIG. 1 in that the voltage regulator 3C does not include the voltage divider resistor 303, the short-circuiting transistor 313, and the resistor 314 of FIG. 1. A fail-safe regulation voltage change-over circuit 10A consist of a single OR gate 113. The engine control unit 4D includes a control transistor 406 and a resistor 407. The emitter of the control transistor 406 is grounded. The collector of the control transistor 406 is coupled to the non-inverting input terminal of the OR gate 113 through the target voltage change-over terminal C1. The resistor 407 is coupled across the inverting input terminal of the OR gate 113 and the base of the control transistor 406. The output of the OR gate 113 of the fail-safe regulation voltage change-over circuit 10A is coupled to the junction point J1 between the voltage divider resistors 301 and 302.

In the case of the circuit of FIG. 5, the output voltage of the AC generator 1 is controlled to two target levels: a reduced level, 14.4 V and a normal level, 15.6 V. The reduced target level is determined by the resistance ratio of the voltage divider resistors 301 and 302. The normal target level is determined by the resistance ratio of the voltage divider resistors 304 and 305. When the output of the OR gate 113 is at the high level H, the output voltage of the AC generator 1 is controlled to the normal level determined by the voltage divider resistors 301 and 302, When, on the other hand, the output of the OR gate 113 is at the low level L, the output voltage of the AC generator 1 is controlled to the second level determined by the voltage divider resistors 304 and 305.

The input signal applied via the resistor 407 to the base of the control transistor 406 represents the need for the quick charging of the battery 5. This signal is supplied to the inverting input terminal of the OR gate 113 through the target voltage change-over terminal C2. If the operation of the control transistor 406 is normal, the target voltage change-over terminal C1 is grounded through the control transistor 406 only when the signal at the C2 is at the high level. The output of the OR gate 113 is the logical OR of C1 and the negation of C2. Thus the output of the OR gate 113 is at the low level L if and only if the signal C2 representing the need for quick charging rises to the high level H and, in response thereto, the control transistor 406 is turned on. The low level L output of the OR gate 113 disables the first voltage detector circuit consisting of the voltage divider resistors 301 and 302, such that the voltage at the junction point J2 provided by the second voltage detector circuit consisting of the voltage divider resistors 304 and 305 determines the ON/OFF of the zener diode 306, and hence the target level of the output voltage of the AC generator 1. The OR gate 113 of the fail-safe regulation voltage change-over circuit 10A thus provides the fail-safe function.

The following TABLE 3 shows the relationship among: the input signal to the base of the control transistor 406 (the rightmost column Tr406); the voltage levels at the target voltage change-over terminal C1 and C2; the inversion of the C2; the output of the OR gate 113; the target regulation voltage, and the corresponding state.

TABLE 3

| Tr406 | C1 | C2 | Inv. of C2 | OR 113 | Reg. Volt | State |
| --- | --- | --- | --- | --- | --- | --- |
| grounded | L | L | H | H | 14.4 V | S1 |
| open | H | H | L | H | 14.4 V | S2 |
| H(ON) | L | H | L | L | 15.6 V | S3 |
| L(OFF) | H | L | H | H | 14.4 V | S4 |

In the normal state, or when the engine control unit 4D fails (state S4), input signal to the base of the control transistor 406 of the engine control unit 4D is at the low level L, and hence the control transistor 406 is turned off. Thus, the input signal C1 to the non-inverting input terminal of the OR gate 113, the input signal C2 to the inverting input terminal thereof, and the inversion of the signal C2 are at the high level H, at the low level L, and at the high level H, as shown in the TABLE 3. The output of the OR gate 113 is thus at the high level H, and the output voltage of the AC generator i is controlled to the normal level determined by the resistance ratio of the voltage divider resistors 301 and 302.

When on the other hand, the discharge of the battery 5 is conspicuous and the battery 5 must be charged quickly, or when the engine is decelerating, the input signal to the base of the control transistor 406 is raised to the high level H, thereby turning on the control transistor 406. The output of the OR gate 113 thus falls to the low level L, to reduce the voltage level at the junction point J1 substantially to the ground level. The first voltage detector circuit consisting of the voltage divider resistors 301 and 302 is thus disabled and can no longer detect the terminal voltage of the battery 5. The output voltage of the AC generator 1 is now controlled to the quick charging level determined by the resistance ratio of the voltage divider resistors 304 and 305, coupled to the auxiliary output terminal 202 of the AC generator 1. The battery 5 is thus quickly charged.

When the target voltage change-over terminal C1 and C2 are opened or disconnected (state S2 in TABLE 3), or when target voltage change-over terminal C1 and the C2 are grounded (state S1), the output of the OR gate 113 is kept at the high level H, and the voltage at the junction point J1 is proportional to the voltage at the battery terminal voltage detector terminal A, the proportionality factor being determined by the resistance ratio of the voltage divider resistor 302 with respect to the sum of the resistors 301 and 302. The output voltage of the AC generator 1 is thus controlled to the normal level based on the terminal voltage level of the battery 5.

Figure 6:
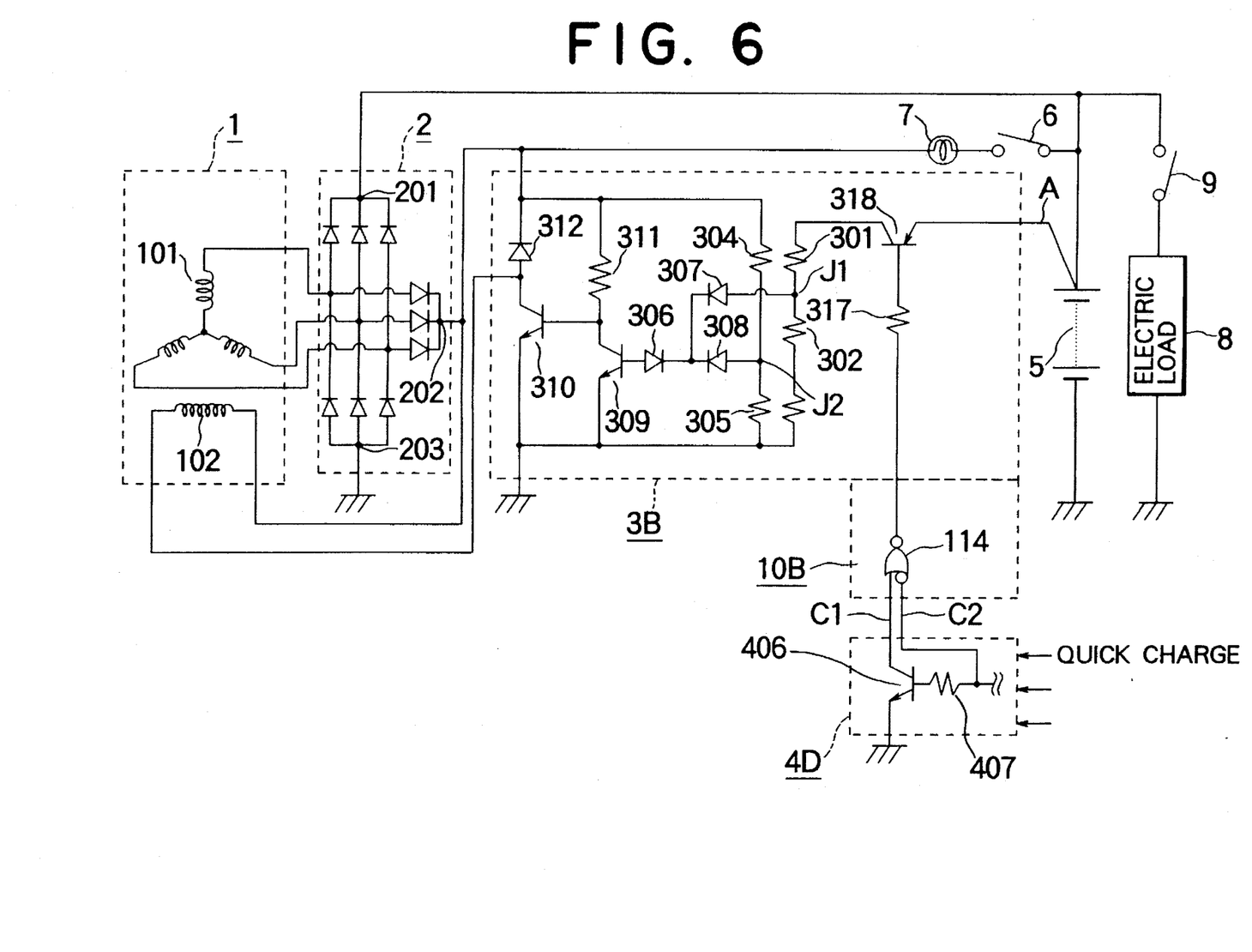
FIG. 6 is a circuit diagram showing a control device for a vehicular AC generator according to a sixth embodiment of this invention.

FIG. 6 is a circuit diagram showing a control device for a vehicular AC generator according to a sixth embodiment of this invention. In FIG. 6, the parts 1, 2, and 5 through 9 are identical to those of FIG. 1. The engine control unit 4D, on the other hand, is identical to that of FIG. 5. The voltage regulator 3D of FIG. 6 is distinguished from the voltage regulator 3B of FIG. 4 in that the voltage regulator 3D does not include the short-circuiting transistor 313 and the resistor 314.

A fail-safe regulation voltage change-over circuit 10B consists of a single NOR gate 114. The engine control unit 4D includes a control transistor 406 and a resistor 407. The emitter of the control transistor 406 is grounded. The collector of the control transistor 406 is coupled to the non-inverting input terminal of the NOR gate 114 through the target voltage change-over terminal C1. The resistor 407 is coupled across the inverting input terminal of the NOR gate 114 and the base of the control transistor 406. The output of the NOR gate 114 of the fail-safe regulation voltage change-over circuit 10B is coupled to the base of the ON/OFF transistor 318 through the resistor 317.

The operation of the circuit of FIG. 6 is similar to that of the circuit of FIG. 5. However, in response to the high level H output of the NOR gate 114, the ON/OFF transistor 318 is turned off to disconnect the terminal of the battery 5 from the first voltage detector circuit consisting of the resistors 301 and 302. The output of the NOR gate 114 is the logical AND of the negation of the signal C1 and the signal C2. Thus the output of the NOR gate 114 rises to the high level H to disable the first voltage divider resistors 301 and 302 if and only if the signal representing the need for quick charging is applied on the base of the control transistor 406 and, further, the control transistor 406 is turned on in response thereto.

The following TABLE 4 shows the relationship among: the input signal to the base of the control transistor 406 (the rightmost column Tr406); the voltage levels at the target voltage change-over terminal C1 and C2; the inversion of the C2; the output of the NOR gate 114; the target regulation voltage, and the corresponding states.

TABLE 4

| Tr406 | C1 | C2 | Inv. of C2 | OR 114 | Reg. Volt | State |
| --- | --- | --- | --- | --- | --- | --- |
| grounded | L | L | H | L | 14.4 V | S1 |
| open | H | H | L | L | 14.4 V | S2 |
| H(ON) | L | H | L | H | 15.6 V | S3 |
| L(OFF) | H | L | H | L | 14.4 V | S4 |

In the normal state, or when the engine control unit 4D fails (state S4), input signal to the base of the control transistor 406 of the engine control unit 4D is at the low level L, and hence the control transistor 406 is turned off. Thus, the input signal C1 to the non-inverting input terminal of the NOR gate 114, the input signal C2 to the inverting input terminal thereof, and the inversion of the signal C2 are at the high level H, at the low level L, and at the high level H, as shown in the TABLE 4. The output of the NOR gate 114 is thus at the low level L, and the ON/OFF transistor 318 is turned on. The output voltage of the AC generator 1 is controlled to the normal level determined by the resistance ratio of the voltage divider resistors 301 and 302.

When on the other hand, the discharge of the battery 5 is conspicuous and tile battery 5 must be charged quickly, or when the engine is decelerating, the input signal to the base of the control transistor 406 is raised to the high level H, thereby turning on the control transistor 406. The output of the NOR gate 114 thus rises to the high level H, to turn off the ON/OFF transistor 318 and disconnect electrically the first voltage divider resistors 301 and 302 from the battery terminal voltage detector terminal A coupled to the battery 5. The first voltage detector circuit consisting of the voltage divider resistors 301 and 302 is thus disabled and can no longer detect the terminal voltage of the battery 5. The output voltage of the AC generator 1 is now controlled to the quick charging level determined by the resistance ratio of the voltage divider resistors 304 and 305, coupled to the auxiliary output terminal 202 of the AC generator 1. The battery 5 is thus quickly charged.

When the target voltage change-over terminal C1 and C2 are opened or disconnected (state S2 in TABLE 4), or when target voltage change-over terminal C1 and the C2 are grounded (state S1), the output of the NOR gate 114 is kept at the low level L, and the voltage at the junction point J1 is proportional to the voltage at the battery terminal voltage detector terminal A, the proportionality factor being determined by the resistance ratio of the voltage divider resistor 302 with respect to the sum of the resistors 301 and 302. The output voltage of the AC generator 1 is thus controlled to the normal level based on the terminal voltage level of the battery 5.

What is claimed is:

1. A control device for controlling an output voltage of a vehicular AC generator including a coil, an output voltage of said AC generator being adjusted by a current supply to said coil, said control device comprising:

first voltage detector circuit means, electrically coupled to an output of said AC generator, for outputting a first voltage level proportional to an output voltage of said AC generator;

second voltage detector circuit means, electrically coupled to said output of said AC generator, for outputting a second voltage level proportional to said output voltage of said AC generator, said second voltage level being lower than said first voltage level output from said first voltage detector circuit means;

voltage regulation means, coupled to said first and second voltage detector circuit means, for controlling a current supply to said coil of said AC generator thereby adjusting said output voltage of said AC generator to a target level, wherein said voltage regulation means regulates said current supply to said coil of said AC generator in response to a higher one of said first and second voltage levels output from said first and second voltage detector circuit means; and target regulation voltage change-over means for selectively disabling said first voltage detector circuit means to reduce said first voltage level to a level substantially lower than said second level output from said second voltage detector circuit means such that said voltage regulation means controls said output voltage of said AC generator to a target level corresponding to said second voltage level output from said second voltage detector circuit means when said target regulation voltage change-over means disables said first voltage detector circuit means.

2. A control device for a vehicular AC generator as claimed in claim 1, wherein said first and second voltage detector circuit means consist of a first and a second voltage divider circuit, respectively, said first and second voltage divider circuit being electrically coupled to said output of said AC generator, said first and second voltage level being provided at a first junction point of said first voltage divider circuit and a second junction point of said second voltage divider circuit, respectively.

3. A control device for a vehicular AC generator as claimed in claim 2, wherein said voltage regulation means includes:

reference voltage detector means coupled to said junction points of said voltage dividers of said first and second voltage detector circuit means, said reference voltage detector means being turned on when said higher one of said first and second voltage level exceeds a predetermined reference level; and a switching element coupled serially with said coil of said AC generator, said switching element being turned on and off as said said switching element is turned off and on, respectively.

4. A control device for a vehicular AC generator as claimed in claim 2, wherein said target regulation voltage change-over means includes: short-circuit means for short-circuiting said first junction point in response to a control signal representing a need for a quick charging of a battery electrically coupled to said AC generator.

5. A control device for a vehicular AC generator as claimed in claim 2, wherein said target regulation voltage change-over means includes: disconnector means for electrically disconnecting said first voltage divider from said output of said AC generator in response to a control signal representing a need for a quick charging of a battery electrically coupled to said AC generator.

6. A control device for a vehicular AC generator as claimed in claim 1, wherein said first voltage detector circuit means is coupled to a terminal of a battery electrically coupled to said AC generator and said second voltage detector circuit means is coupled to an output of said AC generator.

7. A control device for a vehicular AC generator as claimed in claim 1, wherein:

said target regulation voltage change-over means includes means for changing said first voltage level output by said first voltage detector circuit means to two distinct levels in response to a first control signal.

8. A control device for a vehicular AC generator as claimed in claim 7, wherein: said target regulation voltage change-over means disables said first voltage detector circuit means in response to a second control signal; and said target regulation voltage change-over means further includes a logical circuit means for determining a consistency of said first and second control signals, wherein said target regulation voltage change-over means changes said first voltage level and disables said first voltage detector circuit on the basis of an judgment of said logical circuit means.

9. A control device for a vehicular AC generator as claimed in claim 6, further comprising a fail-safe circuit means for preventing said target regulation voltage change-over means from disabling said first voltage detector circuit means when an abnormality is detected in said target regulation voltage change-over means.

10. A control device for a vehicular AC generator as claimed in claim 6, wherein said target regulation voltage change-over means includes:

means for generating at least two two-level signals;

judgment means for determining a consistency of said two-level signals; and fail-safe circuit means for preventing said target regulation voltage change-over means from disabling said first voltage detector circuit means when said judgment means detects an inconsistency in said two-level signals.

11. A control device for a vehicular AC generator as claimed in claim 10, wherein said judgment means includes a logical circuit for determining said consistency of said two-level signals.

* * * * *